(12) United States Patent
Ernest

(10) Patent No.: US 11,470,370 B2
(45) Date of Patent: Oct. 11, 2022

(54) CROWDSOURCING PLATFORM FOR ON-DEMAND MEDIA CONTENT CREATION AND SHARING

(71) Applicant: M35creations, LLC, Virginia Beach, VA (US)

(72) Inventor: Michael Joseph Ernest, Virginia Beach, VA (US)

(73) Assignee: M35Creations, LLC, Virginia Beach, VA (US)

( * ) Notice: Subject to any disclaimer, the term of this patent is extended or adjusted under 35 U.S.C. 154(b) by 0 days.

(21) Appl. No.: 17/150,823

(22) Filed: Jan. 15, 2021

(65) Prior Publication Data
US 2022/0232272 A1    Jul. 21, 2022

(51) Int. Cl.
*H04N 21/25* (2011.01)
*G06F 16/9536* (2019.01)
*H04L 65/611* (2022.01)
*H04L 65/612* (2022.01)

(52) U.S. Cl.
CPC ....... *H04N 21/252* (2013.01); *G06F 16/9536* (2019.01); *H04L 65/611* (2022.05); *H04L 65/612* (2022.05)

(58) Field of Classification Search
CPC .............. H04N 21/252; H04L 65/4084; H04L 65/4076; G06F 16/9536
See application file for complete search history.

(56) References Cited

U.S. PATENT DOCUMENTS

| | | |
|---|---|---|
| 9,288,523 B2 | 3/2016 | Jones |
| 9,342,559 B1 | 5/2016 | Jedrzejowicz |
| 9,461,958 B1 * | 10/2016 | Green ............... G06K 9/00288 |
| 9,870,581 B1 | 1/2018 | Vormweg |
| 10,602,310 B2 | 3/2020 | Owen |

(Continued)

FOREIGN PATENT DOCUMENTS

| | | |
|---|---|---|
| KR | 20040088868 A | 10/2004 |
| KR | 101009973 B1 | 1/2011 |

(Continued)

OTHER PUBLICATIONS

U.S. Appl. No. 17/075,475, Final Office Action dated Aug. 11, 2021, 24 pages.

(Continued)

*Primary Examiner* — Fernando Alcon
(74) *Attorney, Agent, or Firm* — Han Santos, PLLC

(57) ABSTRACT

This disclosure describes techniques for improving user experience when servicing on-demand requests by a consumer for a hyper-specific media content in a network environment. The hyper-specific media content may include specified audio, video, etc. that relates to hyper-specific criteria (e.g., specific subject, location, and time condition). In an embodiment, the hyper-specific criteria in a consumer request are compared with stored hyper-specific criteria in a database. A prediction model is then trained on feature parameters of matching stored hyper-specific criteria to generate a trending level classification that can be associated with the hyper-specific criteria in the consumer request. The trending level classification indicates level of interest of third parties and may be used as a basis for content management.

20 Claims, 7 Drawing Sheets

(56) References Cited

U.S. PATENT DOCUMENTS

| | | |
|---|---|---|
| 2002/0058532 A1 | 5/2002 | Snelgrove et al. |
| 2009/0165031 A1* | 6/2009 | Li .................... H04N 7/17318 |
| | | 725/22 |
| 2010/0106634 A1 | 4/2010 | Atureliya |
| 2012/0212668 A1 | 8/2012 | Schultz et al. |
| 2012/0242798 A1* | 9/2012 | McArdle .......... H04N 21/41407 |
| | | 348/46 |
| 2013/0016213 A1 | 1/2013 | Yova et al. |
| 2014/0052738 A1 | 2/2014 | Connell-Giammatteo et al. |
| 2015/0120535 A1 | 4/2015 | Evans |
| 2016/0232719 A1 | 8/2016 | Brinig et al. |
| 2017/0025152 A1 | 1/2017 | Jaime et al. |
| 2018/0101734 A1* | 4/2018 | Lemberger ......... H04N 21/2393 |
| 2018/0241714 A1 | 8/2018 | Green et al. |
| 2019/0018692 A1 | 1/2019 | Indyk et al. |
| 2019/0205472 A1* | 7/2019 | Kulkarni ............. G06F 3/04812 |
| 2019/0266517 A1* | 8/2019 | Nordstrom ............. G06Q 10/02 |
| 2019/0394533 A1 | 12/2019 | Chakraborty et al. |
| 2020/0120023 A1* | 4/2020 | Munson ................ H04L 9/0861 |
| 2020/0259878 A1* | 8/2020 | Yang ....................... H04L 67/18 |
| 2020/0320571 A1* | 10/2020 | Singh ................... H04N 21/233 |

FOREIGN PATENT DOCUMENTS

| | | |
|---|---|---|
| KR | 20140009931 A | 1/2014 |
| WO | 2014134358 A1 | 9/2014 |

OTHER PUBLICATIONS

U.S. Appl. No. 17/075,475, Office Action dated Apr. 26, 2021, 33 pages.

International Patent Application No. PCT/US2021/055794, International Search Report and Written Opinion, dated Feb. 3, 2022, 9 pages.

Introducing Amazon Explore [online]. Amazon [retrieved on Apr. 21, 2022]. Retrieved from the Internet, URL: https://www.amazon.com/b?node=19424628011&ref=ae_stfrt_hro_lrn.

U.S. Appl. No. 17/075,475, Office Action dated Dec. 13, 2021, 30 pages.

U.S. Appl. No. 17/075,475, Final Office Action dated Jul. 11, 2022, 31 pages.

U.S. Appl. No. 17/150,857, Office Action dated Sep. 1, 2022, 46 pages.

* cited by examiner

CROWDSOURCING PLATFORM FOR ON-DEMAND MEDIA CONTENT CREATION AND SHARING

BACKGROUND

Traditionally, consumers have been forced to consume media content in a relatively structured manner. For example, before the advent of cable television, a consumer had relatively few choices in television programming. The consumer wishing to view a particular program had to determine on which station, and at which time the program would be aired.

Over the past few years, content options for consumers have grown dramatically. One reason is the large number of client software applications that have been introduced in the market. There is an ever-increasing variety of content available to consumers via cable networks, satellite distribution, over-the-air broadcasts, the Internet, etc., including without limitation digital and analog video, audio, and multimedia content. Moreover, a variety of devices, such as wireless phones, handheld devices (including PDA, game consoles, etc.) provide more flexibility in the consumption of such content. Similarly, on-demand services and personal video recorders ("PVR") have increased the flexibility for consuming such content. As a result, there is a trend toward consumers viewing and/or listening to entertainment content when and where they desire.

However, consumers are presently limited to accessing multi-media content that was created or authored and scheduled by third-parties rather than as specified by the consumers. Accordingly, present software applications are limited in enabling consumers to specify multi-media content to be created or authored on-demand.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
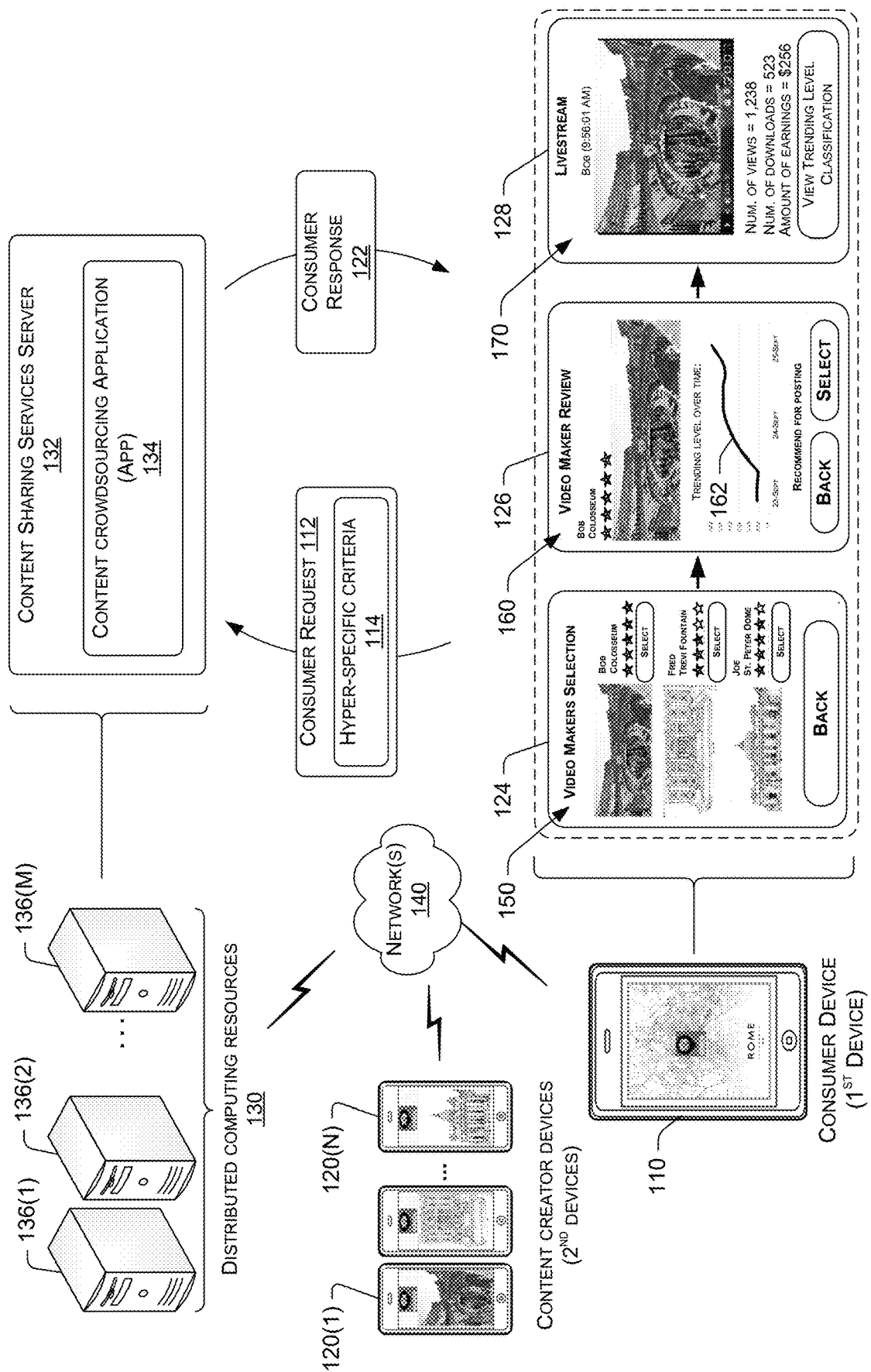
FIG. 1 is a diagram of an example cellular network environment in which the described technological solutions may be implemented, in accordance with at least one embodiment.

This disclosure describes techniques for improving user experience when servicing on-demand requests by a consumer for a hyper-specific media content in a network environment. The hyper-specific media content may include specified audio, video, other media, or multi-media combination content that relates to hyper-specific criteria. For example, the hyper-specific criteria may cover a specifically requested subject and/or object at a specific location, for a specific time, and for a specific future context or event sufficient for a third-party to author media content to capture that context or event. While there may be publicly available videos of Stonehenge, even ones that capture last year's alignment of the sun at the vernal equinox, there is no guarantee that there would be one for this year. Hyper-specific criteria support requests for hyper-specific media content that is unlikely to be generated let alone purposely available online. With the hyper-specific criteria in the media request, the consumer may now order exactly the content to be created or authored, to the point of being able to capture expected particular or future events, on-demand.

In addition, the consumer may now perform content management on the requested hyper-specific media content by comparing the hyper-specific criteria in a consumer request with stored hyper-specific criteria in a database. The stored hyper-specific criteria in the database may include the hyper-specific criteria that are associated with previous transmissions of the hyper-specific media contents by content creator devices. The stored hyper-specific criteria in the database may be further associated with other historical data such as device identifiers of the content creator devices that transmitted the hyper-specific media contents, user ratings, client profiles, and other data that relate to the previous transmissions by the content creator devices. By finding the stored hyper-specific criteria that match the hyper-specific criteria in the consumer request, the consumer may apply or use the associated historical data in the matching stored hyper-specific criteria with the hyper-specific criteria in the consumer request. For example, the consumer may now perform content management on the requested hyper-specific media content by using at least one classification that may be derived from a plurality of features that are associated with the matching stored hyper-specific criteria in a database. The at least one classification may include a dependent label that can be generated from dependent plurality of features as described herein.

Content management may include deploying, evaluating, and managing the received hyper-specific media content. Content management includes posting the requested hyper-specific media content to a social media platform, tracking media content features, etc. Over time, the stored hyper-specific criteria may include historical usage and behavioral data of the media content such as frequency of media content downloading, media content sharing or retransmissions, comments and reactions that can be obtained from different social network platforms, video quality, timeliness of delivery, and similar features. In one example, these features may be used to generate another class such as a trending level classification that indicates a likelihood of interest (e.g., measure of interest) by third parties, a pricing classification that may indicate whether service fee charges for the previously transmitted hyper-specific media content is expensive or cheap, and the like. The (independent) features and the generated (dependent) classification may be surfaced on the consumer device and used for content management purposes.

In an example network environment, a content crowdsourcing application (app) in a server may receive (from the consumer device) a consumer request with associated hyper-specific criteria. The content crowdsourcing app may compare the received hyper-specific criteria with the stored hyper-specific criteria in the database and retrieve the plurality of features (e.g., number of downloads, comments, etc.) that are associated with matching stored hyper-specific criteria in the database. The content crowdsourcing app may then apply an algorithm to the retrieved plurality of features to classify or update the classification of the matching stored hyper-specific criteria in the database. The classification or updated classification may include, for example, the trending level classification that indicates the likelihood of interest over the matching stored hyper-specific media content and, thus, the likelihood of interest to the compared hyper-specific criteria. The classification or updated classification may include dependent labels that can be derived from the stored or measured independent features.

With the calculated/updated classification, the content crowdsourcing app may surface this classification to the consumer device user interface, and the consumer/user may utilize the received classification as a reference for further content management. For example, the consumer may use the classification as a basis for posting the requested media content in social networking distribution platforms when there is a high third-party interest (classification) over the media content. In another example, when there is a detected low interest (classification) by third parties, the consumer may cancel the sent consumer request or adjust the hyper-specific criteria in the consumer request. In these examples, the classification may include a binary dependent label that provides the level interest of the third-parties or audience over the requested media content.

The content crowdsourcing app may periodically train a prediction model on monitored parameters of the plurality of features to calculate and update the classification of each one of the stored hyper-specific criteria in the database. The prediction model may be trained on the independent features such as number of downloads over a time period, number of comments, number of likes, and number of shares to calculate the classification or update previously calculated classification. In this regard, the calculated or updated classification that may be surfaced onto the consumer device may include low variance (e.g., high accuracy) with regard to latest measurements of data features. For example, the content crowdsourcing app monitors the latest actual number of recent downloads, total number of views, number of reactions received from social network platforms, and the like. In this example, the content crowdsourcing app may periodically train the prediction model on these new samples of monitored parameters to update the classification of the corresponding stored hyper-specific criteria in the database. The updated classification may provide the latest information for the consumer to use as a reference.

The prediction model may be created from training data that includes a set of manually classified hyper-specific criteria in the database. Manual classification (e.g., does not use machine learning algorithm) may include multiplying the monitored feature parameters in the stored hyper-specific criteria with corresponding user-configurable weight, aggregating the products of this operation, and comparing the aggregated products to a threshold to generate the classification for the stored hyper-specific criteria. The manual classification may be performed on multiple hyper-specific criteria in the database, and the manually classified hyper-specific criteria may be used as a dataset for the training data.

In some examples, the created prediction model may include a Random Forest algorithm. The Random Forest algorithm may be used to classify new feature samples that can be associated with the matching stored hyper-specific criteria. In an embodiment, the Random Forest algorithm may use decision trees to process the monitored feature parameters (new samples) that are associated with the matching stored hyper-specific criteria. Based on the aggregated outputs of the decision trees, the Random Forest algorithm may generate, for example, the trending level—classification of the matching stored hyper-specific criteria. The classification, such as the trending level classification, is then surfaced in the user interface to show the level of interest of third parties on the requested hyper-specific media content.

The implementation and operations described above ascribed to the use of the server; however, alternative implementations may execute certain operations in conjunction with or wholly within a different element or component of the system(s). Further, the techniques described herein may be implemented in a number of contexts, and several example implementations and context are provided with reference to the following figures. The term "techniques," as used herein, may refer to system(s), method(s), computer-readable instruction(s), module(s)m algorithms, hardware logic, and/or operation(s) as permitted by the context described above and throughout the document.

Example Network Environment

FIG. 1 illustrates a schematic view of a cellular network environment 100 that facilitates the delivery of a hyper-specific media content from a content creator device to a requesting consumer device. In some examples, where consumers desire specific content, the consumers may associate or include hyper-specific criteria in a consumer request to define at least the specific subject, location, and time condition of the hyper-specific media content to be transmitted by the content creator device. In this regard, the consumers may be able to view on-demand the hyper-specific media content without relying on the probability that the hyper-specific media content is handily available through regular Internet searches.

Further, the consumers may be able to view features and classifications that can be associated with the hyper-specific criteria in the consumer request based upon the features and classification that are associated with matching stored hyper-specific criteria in a database as described herein. The matching stored hyper-specific criteria may include the stored hyper-specific criteria that are found to match the hyper-specific criteria in the consumer request. The features of the matching stored hyper-specific criteria may include usage characteristics and other activities that relate to the consumption of the associated hyper-specific media contents. In this case, the features of the matching stored hyper-specific criteria may be associated with the compared hyper-specific criteria in the consumer request.

For example, the features of the matching stored hyper-specific criteria may include user/viewer-generated content such as comments and reactions from social networking platforms, detected number of downloads, number of purchases, and the like. In this example, the user/viewer generated contents, number of downloads, etc. may be associated with the compared hyper-specific criteria in the consumer request. Further, the classification that may be derived from these features of the matching stored hyper-specific criteria may be similarly associated with the compared hyper-specific criteria in the consumer request. For example, the classification may include a calculated trending level classification that indicates the popularity of the hyper-specific media content to the audience of the consumer/requestor. In this example, the trending level classification may be associated with the compared hyper-specific criteria in the consumer request.

The computing environment 100 includes a consumer device 110 that may communicate with a plurality of content creator devices 120(1)-120(N) and distributed computing resources 130 via one or more networks 140. The distributed computing resources 130 may include one or more servers such as a content sharing services server 132. The content sharing services server 132 may further include a content crowdsourcing app 134 that can receive a consumer request 112 including hyper-specific criteria 114 from the consumer device 110, and in doing so execute an algorithm that facilitates sending of a consumer response 122 back to the consumer device 110.

The consumer request 112 may include the hyper-specific criteria 114 for a requested hyper-specific media content, while the consumer response 122 can include back and forth communications with the consumer device 110 including surfacing of at least one associated feature, calculated trending level classification, trending level classification graph, recommendations, livestreaming of the requested hyper-specific media content, etc. The content crowdsourcing app 134 may include hardware, software, or a combination thereof, that processes the consumer request 112 and sends the consumer response 122 based upon the hyper-specific criteria and other specific conditions in the consumer request 112.

The content sharing services server 132 may operate the distributed computing resources 130 that include one or more computing device(s) 136(1)-136(M). The distributed computing resources 130 may operate in a cluster or other configuration to share resources, balance load, increase performance, provide fail-over support or redundancy, or for other purposes. The one or more computing device(s) 136(1)-136(M) may include one or more interfaces to enable communications with other networked devices via one or more network(s) 140. The one or more network(s) 140 may include public networks such as the Internet, private networks such as an institutional and/or personal intranet, or some combination of private and public networks. The one or more network(s) 140 can also include any type of wired and/or wireless network, including but not limited to local area network (LANs), wide area networks (WANs), satellite networks, cable networks, Wi-Fi networks, Wi-Max networks, mobile communications networks (e.g., 3G, 4G, and so forth), or any combination thereof.

The consumer device 110 may include an electronic communication device, including but not limited to, cellular phone, a smartphone, a session initiation protocol (SIP) phone, a laptop, a personal digital assistant (PDA), a satellite radio, a global positioning system (GPS), a multimedia device, a video device, a camera, a game console, a tablet, a smart device, a wearable device, or any other similar functioning device. The consumer device 110 may have a subscriber identity module (SIM), such as an eSIM, to identify the consumer device 110 to a telecommunication service provider network and/or the content crowdsourcing app 134.

As shown in FIG. 1, the consumer device 110 may display different information on its user interface. For example, in response to a detected pin drop search hovering a particular map (e.g., map of Rome, Italy), a video makers selection 150 at a first time instant 124 may depict detected events around a detected pin drop location shown initially in consumer device 110 user interface. Since hundreds of events may be present within the detected pin drop location, the content crowdsourcing app 134 may limit the video makers selection 150 to include top events with high rate of views, downloading, comments, etc. in their respective features.

After a video selection is made, a particular video maker review 160 at a second time instant 126 may show, for example, a selected video maker and a trending level classification graph 162 that is calculated from the features of the selected video. The trending level classification graph 162 may indicate the consumer audience's level of interest in the selected video. At a third time instant 128, when the consumer decides to accept the selected video, a livestreaming of a hyper-specific media content 170 from the selected video maker is shown in the user interface.

In one example, the consumer device 110 may submit the consumer request 112 to the content sharing services server 132 via a communication platform such as an audio-telecommunications service, an email service, short message service (SMS) platform, multimedia messaging (MMS) platform, a rich communication service (RCS) platform, or a social media messaging platform. The consumer request 112 may include the hyper-specific criteria 114 that may define the details for the hyper-specific media content to be viewed or consumed at the consumer device 110. The hyper-specific criteria 114, for example, may include specific details and information about the requested media content such as, but not limited to, a specific object or subject, a particular location, particular context, a particular time window for capturing of the specific object or subject, and the like.

Upon receiving the consumer request 112, the content crowdsourcing app 134 may compare the hyper-specific criteria 114 with stored hyper-specific criteria in a database (not shown). The stored hyper-specific criteria may be associated with hyper-specific media contents that were previously transmitted by the content creator devices 120. Upon finding a match, the content crowdsourcing app 134 may associate the features and classification of the matching stored hyper-specific criteria with the hyper-specific criteria 114. For example, the features of the matching stored hyper-specific criteria in the database include the number of downloads made on the associated hyper-specific media content, number of media content shares, and so on. In this example, these features may be associated with the hyper-specific criteria 114.

The content crowdsourcing app 134 may train a prediction model (not shown) on the features of the matching stored hyper-specific criteria to classify the matching stored hyper-specific criteria. The content crowdsourcing app 134 may periodically train the prediction model within a particular time period to generate the trending level classification graph 162. The trending level classification graph 162 may be surfaced onto the consumer device 110 via the consumer response 122 and used, for example, as additional information for posting of the media content to other distribution platforms.

In some examples, integrated posting tools may implement posting of the hyper-specific media content to social networking platforms. For example, a single click may include placing watermarks on the hyper-specific media content, creation of a thumbnail creation, encryption, association of metadata to the hyper-specific media content, distribution of the hyper-specific media content to multiple social networking platforms, and the like. Further, the single click may include a selection of a second communication platform for livestreaming of hyper-specific media content 170. For example, a more interactive platform or a communication platform with a higher channel bandwidth may be selected by the user to view the livestream hyper-specific media content 170 at a high quality.

Example Consumer Responses from Content Crowdsourcing App

Figure 2:
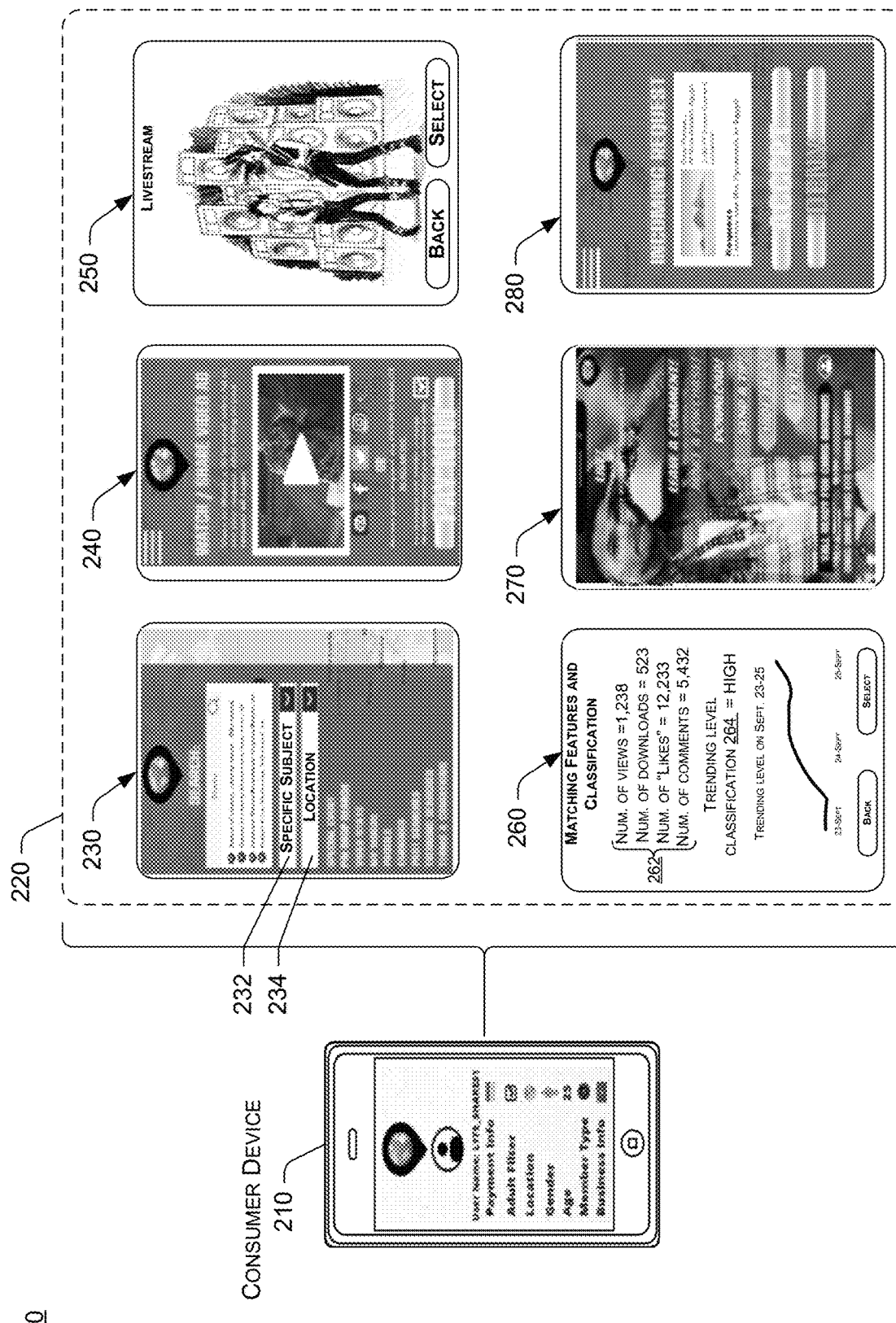
FIG. 2 is a diagram of different consumer responses that may be surfaced onto a user interface of a consumer device, in accordance with at least one embodiment.

FIG. 2 is a block diagram 200 that depicts different consumer responses that may be surfaced onto the consumer device user interface. The content crowdsourcing app sends the depicted consumer responses in response to a received consumer request from the consumer as described in FIG. 1 above.

Block diagram 200 includes a consumer device 210 and consumer responses 220. Consumer responses 220 further include hyper-specific criteria information-request 230, a media content pre-delivery advertisement 240, a livestreaming of a requested hyper-specific media content 250, features and classification parameters 260, a concert promotion 270, and an incoming request 280. In one example, the hyper-specific criteria information-request 230 may be utilized by the consumer to enter a specific subject 232 and a location 234 for the hyper-specific criteria. Upon processing of the user entered hyper-specific criteria, the content crowdsourcing app may optionally surface the media content pre-delivery advertisement 240 onto the consumer device 210. For example, the media content pre-delivery advertisement 240 may include another hyper-specific media content that is posted by another consumer device in the network environment. After the media content pre-delivery advertisement 240 is presented to the customer, the livestreaming of the requested hyper-specific media content 250 is surfaced at the consumer device 210.

Given a situation where the consumer is interested in viewing the features and classification of the requested hyper-specific media content 250, the consumer may have the option of viewing the associated features and classification 260. For example, the requested hyper-specific media content 250 is associated with features 262 that include the number of views, number of downloads, number of comments, etc. and a trending level classification 264 that shows the level of interest by third parties in the requested hyper-specific media content 250. In this example, the consumer may utilize the associated features and classification 260 as references for further posting to other social network platforms, cancellation of the request, and/or to perform other content management. In some examples, the content crowdsourcing app may further surface the concert promotion 270 that relates to previous searches in the consumer device. Further, the content crowdsourcing app may surface the incoming request 280 when another user, for example, is interested in a video that the consumer 210 has posted online.

In an embodiment, when the consumer desires to post the requested hyper-specific media content 250 to other distribution platforms, a single click may implement placing of the watermarks on the hyper-specific media content, creation of the thumbnail creation, encryption, association of metadata to the hyper-specific media content, and the like.

Example Network Server Environment

Figure 3:
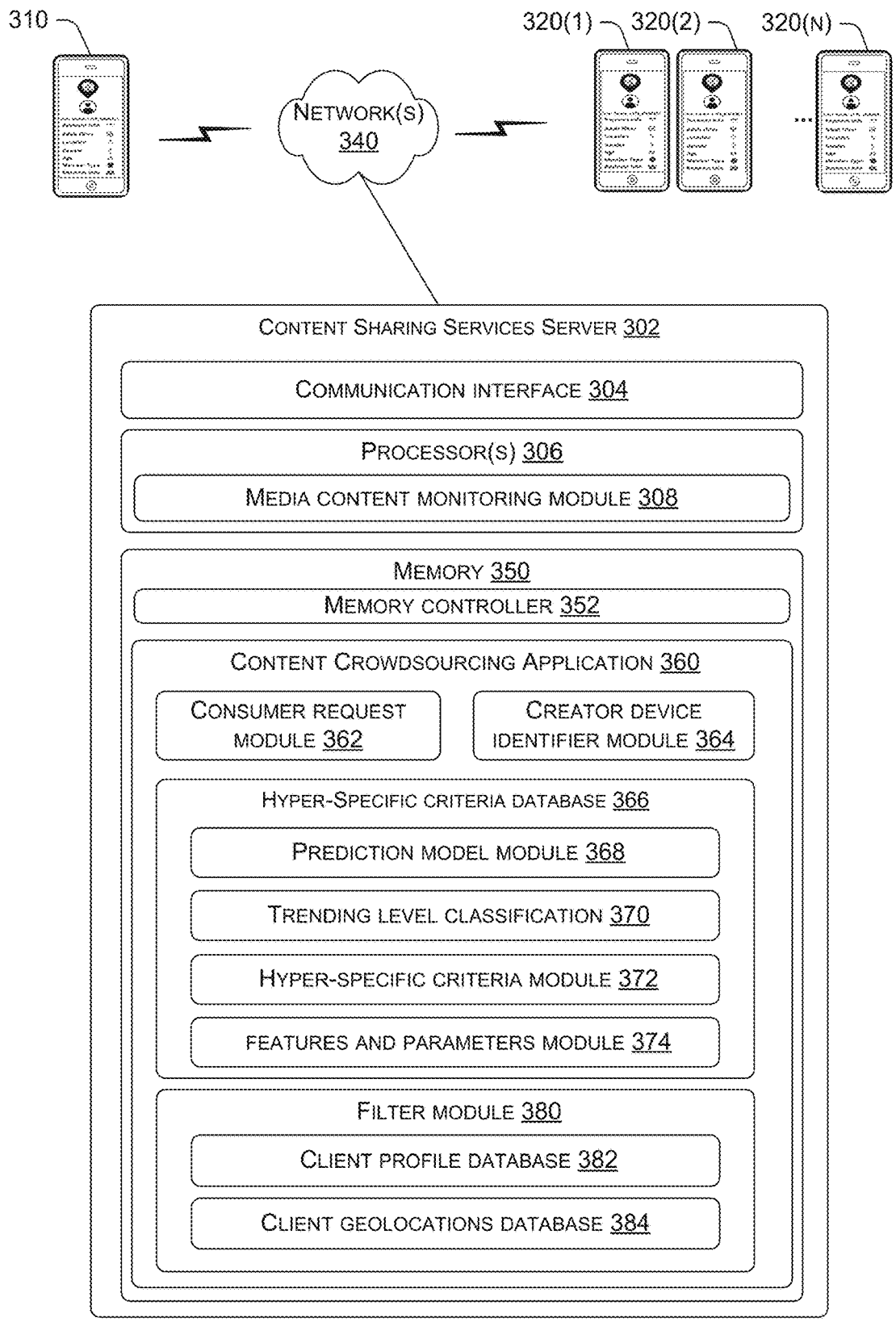
FIG. 3 is a diagram of an example network server environment in accordance with the described technologies.

FIG. 3 is a diagram of an example network server environment 300 in accordance with the technologies described herein. The network server environment 300 includes a server such as a content sharing services server 302 that facilitates livestreaming of the hyper-specific media content from a transmitting content creator device 320 to a consumer device 310 via networks 340. The one or more content sharing services servers 132 shown in FIG. 1 are examples of the content sharing services server 302 in an extended operating environment, in particular, a cellular network environment 100.

The content sharing services server 302 includes hardware, software, or a combination thereof, that processes a consumer request including the hyper-specific criteria and sends a consumer response in return (e.g., consumer request 112/consumer response 122 in FIG. 1). The content sharing services server 302 includes a communications interface 304 that facilitates communication with devices, servers, etc. located outside of the content sharing services server 302, and provides networking capabilities for the content sharing services server 302. For example, the content sharing services server 302, by way of the communications interface 304, may exchange data with other electronic devices such as the consumer devices 310, content creator devices 320, other laptops, computers, servers, etc. via the one or more networks 340. Communication between the content sharing services server 302 and other electronic devices may utilize any sort of communication protocol known in the art for sending and receiving data and/or voice communications.

The content sharing services server 302 includes a processor 306 having electronic circuitry that executes instruction code segments by performing basic arithmetic, logical, control, memory, and input/output (I/O) operations specified by the instruction code. The processor 306 can be a product that is commercially available through companies such as Intel® or AMD®, or it can be one that is customized to work with and control a particular system. The processor 306 may include a media content monitoring module 308 configured to monitor details of transactions for each one of the hyper-specific media contents as described herein. In some examples, the details include the number of transmissions, retransmissions, uploads, and the like. Further, the processor 306 may be coupled to other hardware components used to carry out device operations. The other hardware components may include one or more user interface hardware components not shown individually—such as a keyboard, a mouse, a display, a microphone, a camera, and/or the like—that support user interaction with the content sharing services server 302.

The content sharing services server 302 also includes memory 350 that stores data, executable instructions, modules, components, data structures, etc. The memory 350 may be implemented using computer-readable media. Computer-readable media includes, at least, two types of computer-readable media, namely computer-readable storage media and communications media. Computer-readable storage media includes, but is not limited to, Random Access Memory (RAM), Dynamic Random Access Memory (DRAM), Read-Only Memory (ROM), Electrically Erasable Programmable Read-Only Memory (EEPROM), flash memory or other memory technology, Compact Disc-Read-Only Memory (CD-ROM), digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. As defined herein, computer-readable storage media do not consist of and are not formed exclusively by, modulated data signals, such as a carrier wave. In contrast, communication media may embody computer-readable instructions, data structures, program modules, or other data in a modulated data signal, such as a carrier wave, or other transmission mechanisms.

A memory controller 352 is stored in the memory 350 of the content sharing services server 302. The memory controller 352 may include hardware, software, or a combination thereof, that enables the memory 350 to interact with the communication interface 304, processor 306, and other components of the content sharing services server 302. For example, the memory controller 352 receives the consumer request from the communication interface 304 and sends the received consumer request to a content crowdsourcing app 360 for further processing. In another example, the memory controller 352 may retrieve data from memory 350 where the data will be processed in the processor 306. Still, in another example, the memory controller 352 in communication with the processor 306 and the communication interface 304 may facilitate the sending of the consumer request to the content creator devices 320, and so on. The content crowdsourcing app 360 is similar to the content crowdsourcing app 134 as described above in FIG. 1.

The memory 350 also stores the content crowdsourcing app 360 that, when executed, receives the hyper-specific criteria in the consumer request, compares the hyper-specific criteria with stored hyper-specific criteria that are associated with previously transmitted hyper-specific media contents, retrieves features and parameters that are associated with matching hyper-specific criteria, trains a prediction model on the retrieved features and parameters to classify the matching hyper-specific criteria, and sends the classification to the consumer device 310. In one example, the matching stored hyper-specific criteria may include the specific object, location, and time of the hyper-specific criteria in the consumer request. In this case, the calculated classification of the matching hyper-specific criteria may be utilized as a reference for content management in the consumer device 310.

The content crowdsourcing app 360 may further monitor the feature parameters that are associated with the stored hyper-specific criteria and periodically train the prediction model to update the corresponding classifications of the stored hyper-specific criteria in the database. The content crowdsourcing app 360 may be a single block of executable instructions or it may be made up of several components, as shown. The components included in at least one implementation are described below. However, it is noted that in other implementations, more or fewer components may be configured, and that one or more operations attributed to a particular component in the following description may be implemented in one or more other components.

As shown, the content crowdsourcing app 360 includes a consumer request module 362, a creator device identifier module 364, and a hyper-specific criteria database 366 including a prediction model module 368, trending level classification 370, hyper-specific criteria module 372, and features and parameters module 374. Also shown in FIG. 3 and stored in the memory 350, are a filter module 380, a client profile database 382, and a client geolocation database 384. Although shown as part of the content crowdsourcing app 360, the filter module 380, client profile database 382, and the client geolocation database 384 may be stored in other memory (not shown), in other content sharing services server, or in remote locations.

The consumer request module 362 includes a hardware circuit configured to receive and process a plurality of consumer requests (e.g., consumer request 112 in FIG. 1) from consumer devices. The consumer request includes, for example, the hyper-specific criteria that may define the specifications of the hyper-specific media content to be viewed by the consumer. In this example, the consumer request module 362 may extract the components of the hyper-specific criteria that will be used as references for finding the matching stored hyper-specific criteria in the database.

For example, the received consumer request includes audio data, text data, image data, a pin drop, etc. that may represent the hyper-specific criteria for the requested hyper-specific media content. In this example, the consumer request module 362 may parse and extract the audio data and text data of the request via natural language processing (NLP) and natural language understanding (NLU) algorithms to determine a literal and intended meaning of the audio/text data in the consumer request. Further, the consumer request module 362 may extract the image data of the consumer request by extracting feature representations of the image data and determining similarities with a dataset of stored images within the hyper-specific criteria database 366. The consumer request module 362 may then use a probabilistic machine learning algorithm (not shown) in order to identify the specific object in the consumer request. The consumer request module 362 may also parse the pin drop by utilizing the hyper-specific criteria database 366 to search for the associated specific subject and location, and so on. After extracting the components, the consumer request module 362 may send the extracted components (e.g., specific subject, location, and like) to the hyper-specific criteria database 366 for storage and/or further processing.

The creator device identifier module 364 includes a hardware circuit configured to select the content creator device 320 that may transmit the hyper-specific media content for a particular event. The creator device identifier module 364 may utilize authoring qualifications and the hyper-specific criteria in the consumer request to perform the selection. The creator device identifier module 364 may further use the information in the hyper-specific criteria database 366, client profile database 382, and client geolocations database 384 as references for the selection of the content creator devices 320.

In one example, the creator device identifier module 364 compares the identified/extracted components of the hyper-specific criteria in the consumer request with a list of stored hyper-specific criteria in the hyper-specific criteria database 366. Given a situation where the matching hyper-specific criteria are found, the creator device identifier module 364 may identify the content creator devices 320 that are associated with the matching hyper-specific criteria. These associated content creator devices 320 may be considered as potential content creator devices that may transmit the requested hyper-specific media content. Further, the features and other data of the matching hyper-specific criteria may be associated with the compared hyper-specific criteria in the consumer request. These features include user-generated content such as comments from social network platforms, number of views, number of downloads, and number of shares within a time period.

The prediction model module 368 may include a hardware circuit configured to monitor feature parameters of the stored hyper-specific criteria in the hyper-specific criteria module 372 and apply the prediction model algorithm to the monitored feature parameters to classify the corresponding stored hyper-specific criteria. In some examples, the prediction model module 368 periodically trains the prediction model algorithm such as the Random Forest algorithm on the latest set of monitored feature parameters that are stored in the features and parameters module 374. In this case, the training of the Random Forest algorithm may update the classifications of the corresponding stored hyper-specific criteria. The updated classifications are then stored in the trending level classification 370.

The trending level classification 370 may store a class label or category for each one of the stored hyper-specific criteria in the database. The class label or category may include a dependent parameter that can be calculated from the associated feature parameters of the stored hyper-specific criteria. The class label, for example, may indicate the level of interest by third parties to view, purchase, download, retransmit, etc. the hyper-specific media content that is associated with the hyper-specific criteria. The trending level classification 370 may include additional information that can be used by the user as a reference for content management. For example, the data in the trending level classification 370 may be used to generate the trending level classification graph 162 in FIG. 1. In this example, the user may use the received trending level classification as a reference for the further posting of the requested hyper-specific media content in multiple social networking platforms, adjusting the hyper-specific criteria in the consumer request, and so on.

The features and parameters module 374 may store the historical usage and behavioral data of the stored hyper-specific criteria in the hyper-specific criteria module 372. The historical usage and behavioral data are retrieved when the stored hyper-specific criteria are found to match the hyper-specific criteria in the consumer request. In this case, the retrieved historical usage and behavioral data (e.g., independent features) may be used for classifying the stored hyper-specific criteria in the hyper-specific criteria module 372. For example, the Random Forest algorithm run these features in its multiple decision trees. In this example, the aggregated outputs of the decision trees may be used to determine the classification of the stored hyper-specific criteria. The classification is then applied to correspond with the hyper-specific criteria in the consumer request.

The filter module 380 includes a hardware circuit configured to screen or filter the livestream hyper-specific media content to be delivered to the consumer device 310. The filter module 380 may utilize the information in the client profile database 382, and client geolocations database 384, to improve the services of transmitting hyper-specific media contents to the consumer device 110.

Further functionalities of the content sharing services server 302 and its component features are described in greater detail, below, with respect to examples of methodological implementations of the novel techniques described and claimed herein.

Example Implementation—Generating a Classification for Content Management

Figure 4:
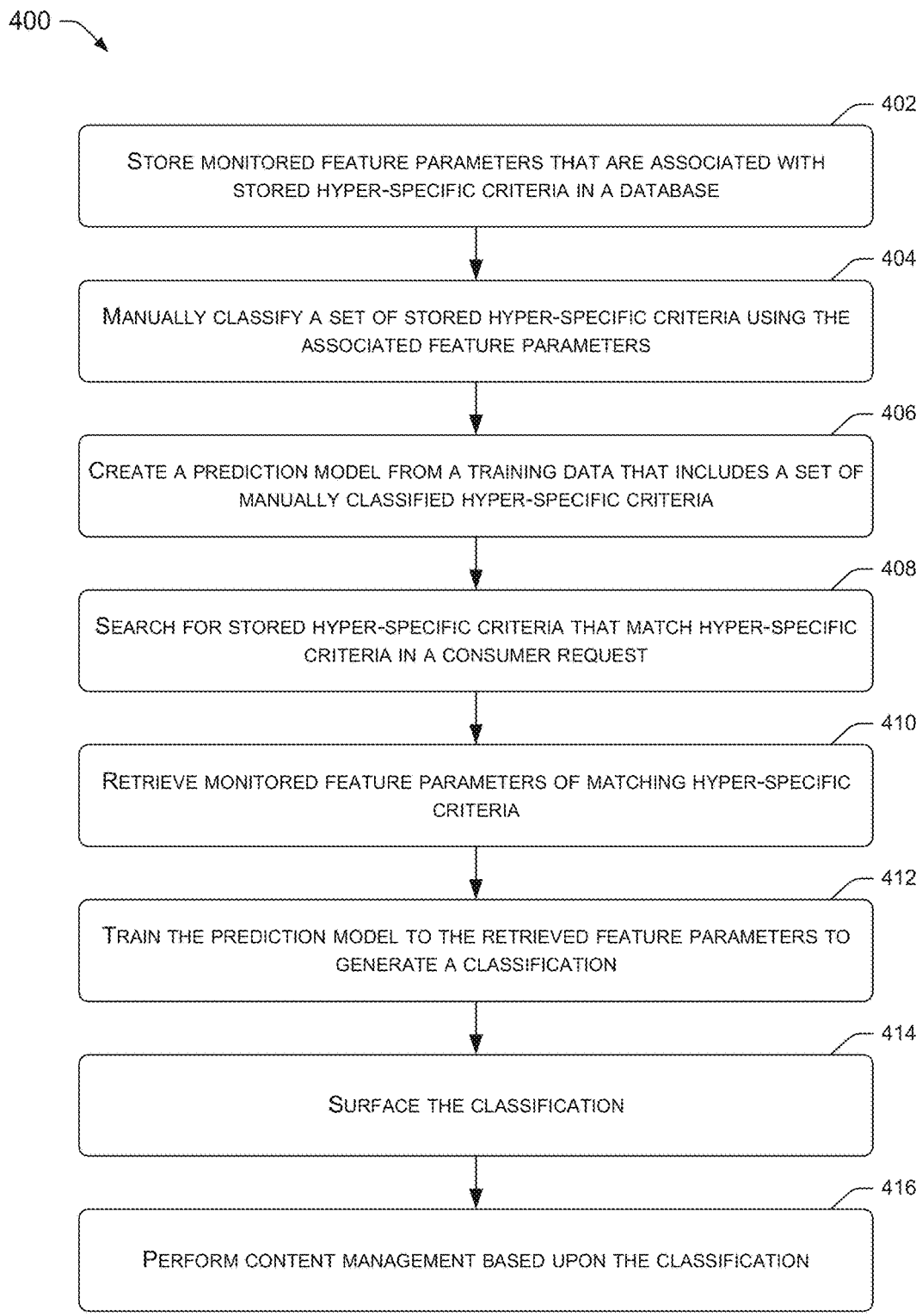
FIG. 4 is a flow diagram of an example methodological implementation for creating a prediction model and training the prediction model to classify stored hyper-specific criteria in a database, in accordance with at least one embodiment.

FIG. 4 is a flow diagram 400 that depicts a methodological implementation of at least one aspect of the techniques for classifying features that are associated with stored hyper-specific criteria in the database and surfacing the classification in the consumer device to be used as a reference for content management by the consumer/user. In the following discussion of FIG. 4, continuing reference is made to the elements and reference numerals shown in and described with respect to the network server environment 300 and content sharing services server 303 of FIG. 3. Further, certain operations may be ascribed to particular system elements shown in previous figures. However, alternative implementations may execute certain operations in conjunction with or wholly within a different element or component of the system(s). Furthermore, to the extent that certain operations are described in a particular order, it is noted that some operations may be implemented in a different order to produce similar results.

At block 402, the processor 306 and particularly the media content monitoring module 308 monitor and facilitate storing of features and parameters (or feature parameters) in the database. The features may represent historical usage and behavioral data that are associated with each one of the stored hyper-specific criteria in the hyper-specific criteria module 372. The features may include measurable property or parameters that can be used to predict or calculate some discrete output property such as the trending level classification, pricing classification, or other classification that can be derived from the distinct nature of the associated features. For example, the actual number of media content views, downloads, comments, reactions, purchases, retransmissions, and other parameters that relate to consumption of the hyper-specific media content may be measured and used as references (or independent features) to generate or calculate the trending level calculation that indicates the likelihood of interest by third parties.

At block 404, the processor 306 may facilitate manual classification of a set of stored hyper-specific criteria in the hyper-specific criteria database 366. In some examples, a portion of the stored hyper-specific criteria may be classified manually by comparing the monitored parameters with a corresponding preconfigured weight to derive a classification. For example, each one of the five features—number of media content views, downloads, comments, reactions, purchase, and retransmissions that were measured within a particular time period is given an equal weight of 20%. In this example, a basic algorithm (not a machine learning algorithm) may be used to calculate the corresponding weight of each feature, aggregate the weights, and compare the aggregated weights to a preconfigured threshold to determine the classification. This manual classification procedure may be performed on multiple stored hyper-specific criteria in the hyper-specific criteria database 366.

At block 406, the processor 306 creates the prediction model from the training data that includes the set of manually classified hyper-specific criteria in the hyper-specific criteria database 366. For example, a set of 100 manually classified hyper-specific criteria in the hyper-specific criteria database 366 may be used as training data. The set of 100 manually classified hyper-specific criteria may include features that were measured on a particular time period. In this example, a Random Forest (prediction model) algorithm may be generated from the features that are associated with the 100 manually classified hyper-specific criteria in the training data. The generated Random Forest algorithm may include decision trees that can be used to classify new samples of monitored feature parameters from the rest of the stored hyper-specific criteria in the database or classify new samples of monitored features to update the already classified stored hyper-specific criteria. The classification may include, for example, the trending level classification.

At block 408, the creator device identifier module 364 compares hyper-specific criteria in the consumer request with the stored hyper-specific criteria to search for a match. In some examples, for authoring criteria, the hyper-specific criteria in the consumer request may be compared with the stored hyper-specific criteria to identify potential content creator devices 320 that may transmit the requested hyper-specific media content. In other cases, for content management references, the comparison may be performed to obtain the classification that may be associated with the matching stored hyper-specific criteria.

At block 410, the prediction model module 368 retrieves the monitored features and parameters of the matching hyper-specific criteria. Given a situation where the media content monitoring module 308 can easily monitor infinite sequences of data that rapidly grow over time, the prediction model module 368 may retrieve the features and parameters that were recently monitored or collected within a particular time period. For example, the prediction model module 368 retrieves monitored feature parameters within the last hour from the time of receiving the consumer request. In this example, the time period may be a user-configurable parameter that depends upon the nature of the specific subject, location, and time condition in the consumer request.

Given a situation where the consumer downloads five ongoing concerts (hyper-specific media contents) that may be respectively associated with stored hyper-specific criteria in the hyper-specific criteria module 372, the feature parameters of each one of the stored hyper-specific criteria may rapidly grow while the concerts are ongoing. In this regard, the prediction model module 368 may retrieve the monitored parameters in the last twenty minutes, for example, to be used as new sample of data features to generate the classification as further described below.

At block 412 the prediction model module 368 trains the prediction model algorithm to classify the (new sample of) retrieved features and parameters of the matching hyper-specific criteria. In some examples, the prediction model such as the Random Forest algorithm may run the retrieved parameters on its decision trees to calculate or update the trending level classification of the matching hyper-specific criteria. In this example, the Random Forest algorithm maps the retrieved parameters as input to generate the trending level classification as a particular output. In the example above, where the consumer downloaded five ongoing concerts that are respectively associated with stored hyper-specific criteria in the hyper-specific criteria module 372, the prediction model algorithm may be trained on the feature parameters that are associated with each stored hyper-specific criteria to calculate the trending level classification that may indicate the popularity of each concert.

At block 414, the prediction model module 368 in communication with the processor 306 and the communication interface 304 surfaces the generated trending level classification on the user interface of the consumer device 310. In some examples, the trending level classification may be presented as a binary classification that indicates whether the requested hyper-specific media content will go viral (high output) or not (low output). In other cases, the trending level classification may be presented as a trending level classification graph to show the levels of interest by the third parties over a particular time range.

At block 416, the processor 306 facilitates content management between the consumer device 310 and the content creator devices 320. For example, consumer device 310 selects to distribute the hyper-specific media content to different social network platforms based upon the received trending level classification. In this example, the processor 306 may facilitate the distribution of the hyper-specific media content to the different social network platforms.

Example Implementation—Creating the Prediction Model

Figure 5:
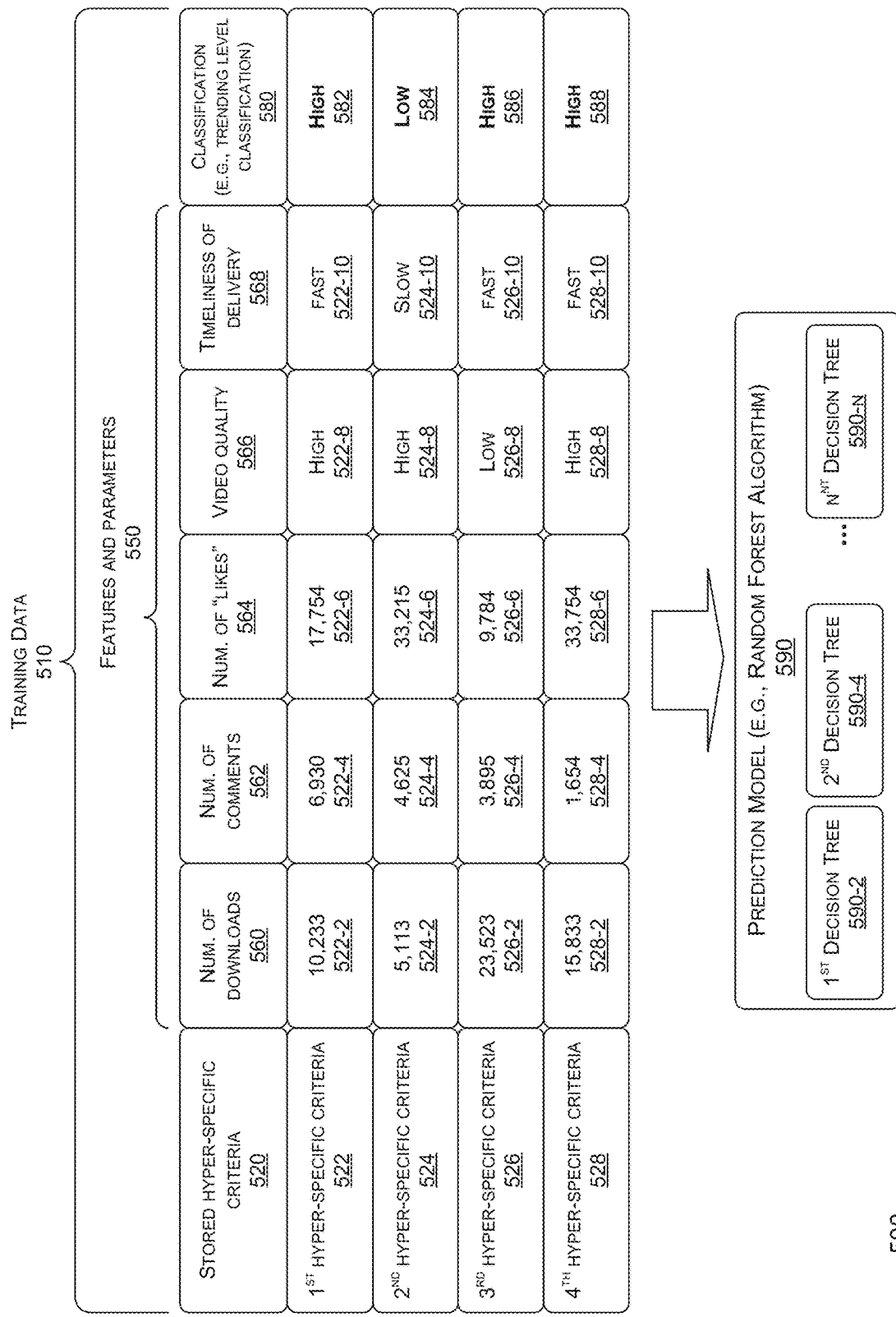
FIG. 5 is a block diagram of example training data and an example prediction model that may be created from the training data, in accordance with at least one embodiment.

FIG. 5 is a block diagram 500 that depicts a training data 510 for creating a Random Forest algorithm 590 (e.g., prediction model) that may be used to classify or update the classification of the stored hyper-specific criteria in the database. The training data 510 may include a set of stored hyper-specific criteria 520, associated features and parameters 550, and manually calculated classifications 580. The set of stored hyper-specific criteria 520 may include first hyper-specific criteria 522, second hyper-specific criteria 524, third hyper-specific criteria 526, and fourth hyper-specific criteria 528. The number of hyper-specific criteria in the training data 510 is for illustration purposes only and additional stored hyper-specific criteria in the database may be added to form the training data 510. The features and parameters 550 include the number of downloads 560, number of comments 562, number of "Likes" 564, video quality 566, and timeliness of delivery 568. The features and parameters 550 may be used to generate decision trees 590(2)-590(N) in the Random Forest algorithm 590. The depicted block diagram 500 is an example implementation of Blocks 402-406 in FIG. 4 where the prediction model is created from the training data that includes a set of manually classified hyper-specific criteria.

In some examples, the content crowdsourcing app 360 uses application program interfaces (APIs) to retrieve social networking platform data such as the number of comments 562, number of Facebook™ "Likes" 564, and other similar third-party reactions to previously transmitted hyper-specific media contents. In other cases, the content crowdsourcing app 360 may directly monitor the number of downloads 560, video quality 566, and timeliness of delivery 568 in the previously transmitted hyper-specific media contents that are associated with stored hyper-specific criteria in the hyper-specific criteria module 372. These features and parameters are stored in the features and parameters module 374 and used for data classification such as the manual classification as described below.

To manually classify the hyper-specific criteria in the set of stored hyper-specific criteria 520, each one of the parameters may be given a certain weight and then aggregated to produce a total weight. The total weight is then compared to a preconfigured threshold to output the corresponding classification 580.

For example, for the first hyper-specific criteria 522, the monitored number of downloads ("10,233" in Block 522-2), number of comments ("6,930" in Block 522-4), number of "Likes" ("17,754" in Block 522-6), video quality ("High" in Block 522-8), and timeliness of delivery ("Fast" in Block 522-10) are given equal weight of 20% for a total of 100%. The processor 306 may perform an algorithm (not machine learning algorithm) that uses the allocated parameter weight to calculate an aggregated weight for the first hyper-specific criteria 522. With the aggregated weight, a preconfigured threshold value (e.g., 80%) may be used to classify the first hyper-specific criteria 522 (e.g., "High" in Block 582). This process is similarly performed on the hyper-specific criteria 524-528 to generate "Low" 584, "High" 586, and "High" 588, respectively. A "high" trending level classification 580 may indicate a high level of interest by third parties while a "low" trending level classification may indicate a lack of interest by other consumers or subscribers.

In an embodiment, the processor 306 may use the features and parameters 550 to generate the decision trees 590(2)-590(N) in the Random Forest algorithm 590. For example, the decision tree 590(2) may be created by using the number of downloads 560 as a root node and using the other parameters (e.g., number of likes 564) as subset variables to build the next steps for the decision tree. A similar step may be used to generate the decision tree 590(4), and so on. The aggregated output of the decision trees 590(2)-590(N) may be used to generate the classification 580 of new samples of data features such as new samples of measured number of downloads 560, number of comments 562, number of "Likes" 564, video quality 566, and timeliness of delivery 568.

In other cases, the media contents may be surfaced based upon details of the hyper-specific criteria in the consumer request rather than the classification 580. For example, the hyper specific criteria may be searching specifically for a certain range of number of comments and downloads. In this example, the media content to be surfaced may be based upon these two independent features only. That is, the prediction model is not required to generate the media contents.

Example Implementation—Classifying Feature Parameters

Figure 6:
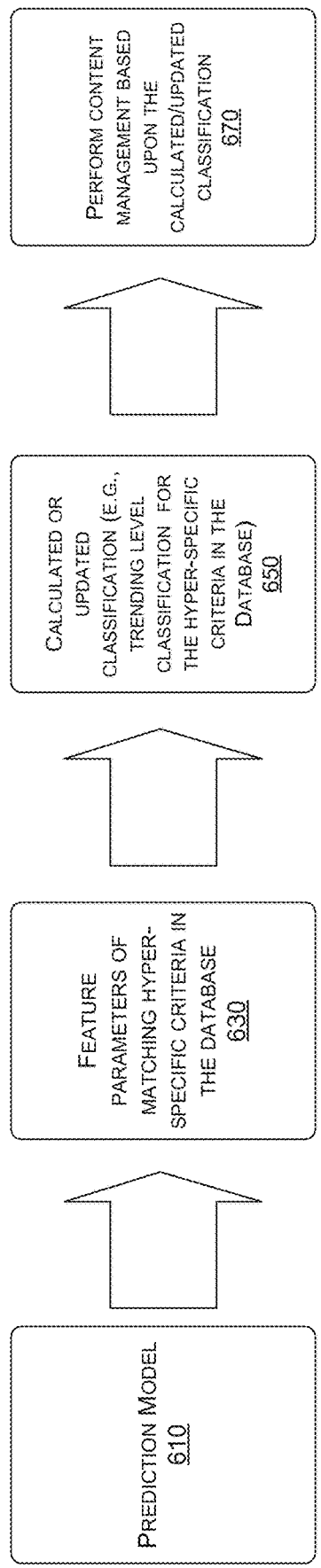
FIG. 6 is a block diagram of an example prediction model that may be used to classify the stored hyper-specific criteria in the database, in accordance with at least one embodiment.

FIG. 6 is a block diagram 600 that depicts a prediction model 610 that is trained to feature parameters of matching hyper-specific criteria 630 in the database to generate the calculated or updated classification 650 of the matching hyper-specific criteria. The classification 650 may then be used as a reference for performing content management at block 670.

In some examples, the prediction model 610 may include a Random Forest algorithm that is trained on new samples of feature parameters of the matching stored hyper-specific criteria 630. Due to the rapid accumulation of data, the Random Forest algorithm may be trained on recently monitored feature parameters of the matching stored hyper-specific criteria 630. For example, the recently monitored feature parameters may include the number of downloads, number of views, etc. that were detected over a particular time period. In this example, the time period may include a time duration that is counted from the receiving of the consumer request. The time duration, for example, is ten minutes, one hour, one day, etc. from a detected receiving timestamp of the consumer request (e.g., consumer request 112 in FIG. 1).

The matching hyper-specific criteria 630 may include the stored hyper-specific criteria that match the hyper-specific criteria in the consumer request (e.g., hyper-specific criteria 114/consumer request 112 in FIG. 1). In some examples, the content crowdsourcing app 360 receives the consumer request including the associated hyper-specific criteria and searches the database for the matching hyper-specific criteria 630. Upon finding the matching hyper-specific criteria, the content crowdsourcing app 360 may train the prediction model 610 on the new samples of monitored feature parameters of the matching hyper-specific criteria to generate a classification at block 650. Thereafter, the generated classification of the matching stored hyper-specific criteria may be used as a basis for performing content management at block 670.

Example Implementation—Surfacing Trending Level Classification

Figure 7:
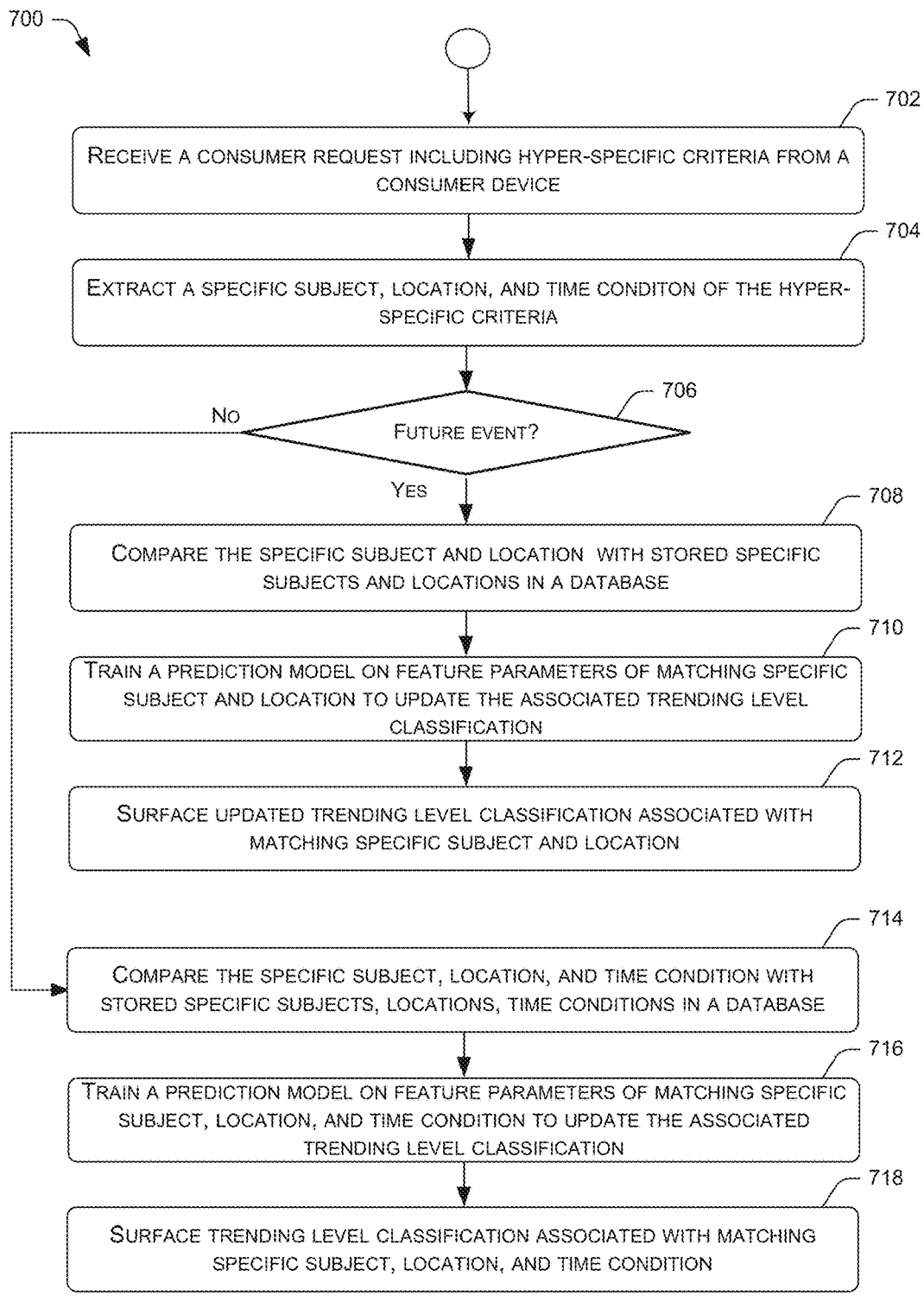
FIG. 7 is a flow diagram of an example methodological implementation for improving user experience by surfacing features and a calculated classification of the stored hyper-specific criteria for content management, in accordance with at least one embodiment.

FIG. 7 is a flow diagram 700 that depicts a methodological implementation of at least one aspect of the techniques for improving the user experience when servicing on-demand requests of a consumer to view hyper-specific media content in a network environment. Particularly, the flow diagram 700 shows the calculating or updating of the trending level classification that will be used as a reference for content management in the consumer device. In the following discussion of FIG. 7, continuing reference is made to the elements and reference numerals shown in and described with respect to the network server environment 300 and content sharing services server 302 of FIG. 3. Further, certain operations may be ascribed to particular system elements shown in previous figures. However, alternative implementations may execute certain operations in conjunction with or wholly within a different element or component of the system(s). Furthermore, to the extent that certain operations are described in a particular order, it is noted that some operations may be implemented in a different order to produce similar results.

At block 702, the processor 306 in communication with the communication interface 304 receives from the consumer device 310 a consumer request with associated hyper-specific criteria. For example, consumer device 310 is requesting to download ABC's concert that is currently being performed at XYZ Hotel, Las Vegas, Nev. In this example, the specific subject is ABC's concert, and the specific location and time condition are XYZ Hotel, Las Vegas, Nev., and real-time respectively.

At block 704, the consumer request module 362 extracts the components of the hyper-specific criteria. The components may include a specific subject, location, and a time condition.

At decision block 706, the processor 306 or the creator device identifier module 364 determines whether the extracted time condition relates to a particular future event. If the extracted time condition relates to the particular future event ("Yes" at Block 706), then, at block 708, the creator device identifier module 364 compares the specific subject and location with stored specific subjects and locations in the database. At block 710, the prediction model module 368 trains the prediction model 590 on monitored feature parameters of the matching specific subject and location to update the associated trending level classification. At block 712, the prediction model module 368 surfaces the updated trending level classification to the consumer device.

Returning to decision block 706, if the extracted time condition relates to previous event ("No" at Block 706), then, at block 714, the creator device identifier module 364 compares the specific subject, location, and time condition with stored specific subjects, locations, and time conditions in the database. At block 716, the prediction model module 368 trains the prediction model 590 on monitored feature parameters of the matching specific subject, location, and time condition to update the associated trending level classification. At block 718, the prediction model module 368 surfaces the updated trending level classification to the consumer device.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed is:

1. One or more computer-readable storage media collectively storing computer-executable instructions that upon execution collectively cause one or more computers to perform acts comprising:

receiving, from a first device, a request for a real-time delivery of a media content of a particular future event, wherein the request includes a hyper-specific media content criteria having a specific subject, location, and a time for the first device to order exactly the media content of the particular future event that will be authored by a second device;

comparing the specific subject and the specific location with stored specific subjects and locations in a database;

updating a classification that is associated with matching specific subject and location, wherein the updating includes training an algorithm with respect to at least one feature of the matching specific subject and location; and performing a media content management based upon the classification.

2. The one or more computer-readable storage media of claim 1, wherein the classification includes a trending level classification that indicates a measure of interest for the particular future event.

3. The one or more computer-readable storage media of claim 1, wherein the at least one feature includes number of downloads and number of views of a media content that is associated with the matching specific subject and location.

4. The one or more computer-readable storage media of claim 1, wherein the at least one feature includes parameters that are monitored over a particular time period.

5. The one or more computer-readable storage media of claim 1, wherein the algorithm is trained periodically to update corresponding classifications of the stored specific subjects and locations.

6. The one or more computer-readable storage media of claim 1, wherein the stored specific subjects and locations are associated with previously transmitted media contents.

7. The one or more computer-readable storage media of claim 1, wherein the algorithm includes a Random Forest algorithm.

8. The one or more computer-readable storage media of claim 1, wherein the algorithm is created from a training data that includes manually classified stored specific subjects and locations.

9. The one or more computer-readable storage media of claim 1, wherein an updated classification that is associated with the matching specific subject and location is associated with the hyper-specific media content criteria in a received request.

10. A device, comprising:

a processor;

a memory coupled to the processor, the memory storing computer-executable instructions that are executable by the processor to perform a plurality of actions, the plurality of actions comprising:

receiving a request for a real-time delivery of a media content of a particular future event, wherein the request includes a hyper-specific media content criteria having a specific subject, location, and a time for the request to or order exactly the media content of the particular future event that will be authored by another device;

comparing the specific subject and the specific location with stored specific subjects and locations in a database; and training an algorithm with respect to at least one feature of matching specific subject and location to update a classification that is associated with the matching specific subject and location; and facilitating media content management based upon the classification.

11. The device of claim 10, wherein the classification includes a trending level classification that indicates a measure of interest for the particular future event.

12. The device of claim 10, wherein the at least one feature includes number of downloads and number of views of a media content that is associated with the matching specific subject and location.

13. The device of claim 10, wherein the at least one feature includes parameters that are monitored over a particular time period.

14. The device of claim 10, wherein the algorithm is trained periodically to update corresponding classifications of the stored specific subjects and locations.

15. The device of claim 10, wherein the stored specific subjects and locations are associated with previously transmitted media contents.

16. The device of claim 10, wherein the algorithm includes a Random Forest algorithm.

17. The device of claim 10, wherein the algorithm is created from a training data that includes manually classified stored specific subjects and locations.

18. A computer-implemented method, comprising:

receiving, from a first device, a request for a real-time delivery of a media content of a particular future event, wherein the request includes a hyper-specific media content criteria having a specific subject, location, and a time for the first device to order exactly the media content of the particular future event that will be authored by a second device;

comparing the specific media content subject and media content location with stored specific subjects and locations in a database;

periodically training an algorithm with respect to at least one feature of matching specific subject and location to update a classification that is associated with the matching specific subject and location;

sending the media content including the classification to the first device; and performing a media content management based upon the classification.

19. The computer-implemented method of claim 18, wherein the classification includes a trending level classification that indicates a measure of interest for the particular future event.

20. The computer-implemented method of claim 18, wherein the at least one feature includes number of downloads and number of views of a media content that is associated with the matching specific subject and location.

* * * * *